US008122146B1

(12) United States Patent
Lu et al.

(10) Patent No.: US 8,122,146 B1
(45) Date of Patent: *Feb. 21, 2012

(54) INTELLIGENT SWITCHING OF CLIENT PACKETS AMONG A GROUP OF SERVERS

(75) Inventors: Leonard L Lu, Holmdel, NJ (US); Deh-Phone K Hsing, Basking Ridge, NJ (US); Bo-Chao Cheng, Summit, NJ (US); Tsong-Ho Wu, Englishtown, NJ (US)

(73) Assignee: Open Invention Network, LLC, Durham, NC (US)

( * ) Notice: Subject to any disclaimer, the term of this patent is extended or adjusted under 35 U.S.C. 154(b) by 24 days.

This patent is subject to a terminal disclaimer.

(21) Appl. No.: 12/759,806

(22) Filed: Apr. 14, 2010

Related U.S. Application Data

(63) Continuation of application No. 12/235,367, filed on Sep. 22, 2008, which is a continuation of application No. 11/218,444, filed on Sep. 2, 2005, now Pat. No. 7,437,473, which is a continuation of application No. 09/883,852, filed on Jun. 18, 2001, now Pat. No. 6,944,678.

(51) Int. Cl.
*G06F 15/16* (2006.01)

(52) U.S. Cl. .......................................... 709/236; 709/238

(58) Field of Classification Search .................. 709/236, 709/238, 217, 219, 223, 224, 229
See application file for complete search history.

(56) References Cited

U.S. PATENT DOCUMENTS

| 6,473,403 | B1 | 10/2002 | Bare |
| 6,578,068 | B1 | 6/2003 | Bowman-Amuah |
| 6,580,715 | B1 | 6/2003 | Bare |
| 6,598,034 | B1 | 7/2003 | Kloth |
| 6,772,211 | B2 | 8/2004 | Lu et al. |
| 6,944,678 | B2 | 9/2005 | Lu et al. |
| 7,062,556 | B1 | 6/2006 | Chen et al. |
| 7,062,571 | B1 | 6/2006 | Dale et al. |
| 7,120,662 | B2 | 10/2006 | Vange et al. |
| 7,523,454 | B2 | 4/2009 | Romero et al. |
| 2002/0019853 | A1 | 2/2002 | Vange et al. |

*Primary Examiner* — Krisna Lim
(74) *Attorney, Agent, or Firm* — Williams Mullen

(57) ABSTRACT

The content-aware application switch and methods thereof intelligently switch client packets to one server among a group of servers in a server farm. The switch uses Layer 7 or application content parsed from a packet to help select the server and to schedule the transmitting of the packet to the server. This enables refined load-balancing and Quality of-Service control tailored to the application being switched. In an exemplary embodiment of the invention, a method includes maintaining a server load metric for each server in a group of servers; parsing application content from a packet; selecting a destination server from the group of servers, wherein selecting the destination server is dependent on the server load metric for each server, assigning a priority to the packet, the priority being dependent on the application content; and dropping the packet if the priority comprises at least one of a predetermined type.

20 Claims, 17 Drawing Sheets

| Protocol Layer | OSI | TCP/IP Protocol Stacks | Router/ Switch |
|---|---|---|---|
| 7 | Application | Application | |
| 6 | Presentation | | |
| 5 | Session | | |
| 4 | Transport | Transport (TCP) | Web Switch |
| 3 | Network | Internet (IP) | Router |
| 2 | Data Link | Subnet (MAC) | LAN Switch |
| 1 | Physical | | |

Well-Known TCP port (Softport) Connections

FIG. 4  *PRIOR ART*

| Protocol Layer | TCP/IP | Message | Router/Switch |
|---|---|---|---|
| 5-7 | Application | HTTP Payload: Data & Other Personalized Information | Content-Aware Application Switch |
| | | HTTP Header: URL, Ref, Host, Cookie, ... | |
| 4 | Transport | TCP PortNos | Web Switch |
| 3 | Internet | IP Addresses | Router |
| 2 | Subnet | MAC Addresses | Lan Switch |
| 1 | | | |

*FIG. 6*

PACKET TAG

| Packet ID | Buffer Address | Priority | Previous packet ID | Next packet ID | ---- | Selected Server |
|---|---|---|---|---|---|---|

*FIG. 9*

CLASS CONTENT DICTIONARY

| CLASS | Pattern |
|---|---|
| 1 | .... |
| 2 | .... |
| . | . |
| . | . |
| . | . |
| K | .... |

FIG. 10A

CLASS POLICY TABLE

| CLASS | Priority | Server Group | Class Weight |
|---|---|---|---|
| 1 | .... | .... | .... |
| 2 | .... | .... | .... |
| . | | . | |
| . | | . | |
| . | | . | |
| K | .... | .... | .... |

FIG. 10B

SERVER PROPERTY

| Server | IP & MAC Addresses | Max Connections | Default Server Weight | LOW Margin | HIGH Margin |
|---|---|---|---|---|---|
| 1 | .... | .... | .... | .... | .... |
| 2 | .... | .... | .... | .... | .... |
| ⋮ | | | | | |
| N | .... | .... | .... | .... | .... |

*FIG. 10C*

SERVER STATE

| Server | Current Connections | Current Load | Dynamic Server Weight | Count k |
|---|---|---|---|---|
| 1 | .... | .... | .... | .... |
| 2 | .... | .... | .... | .... |
| ⋮ | | | | |
| N | .... | .... | .... | .... |

*FIG. 10D*

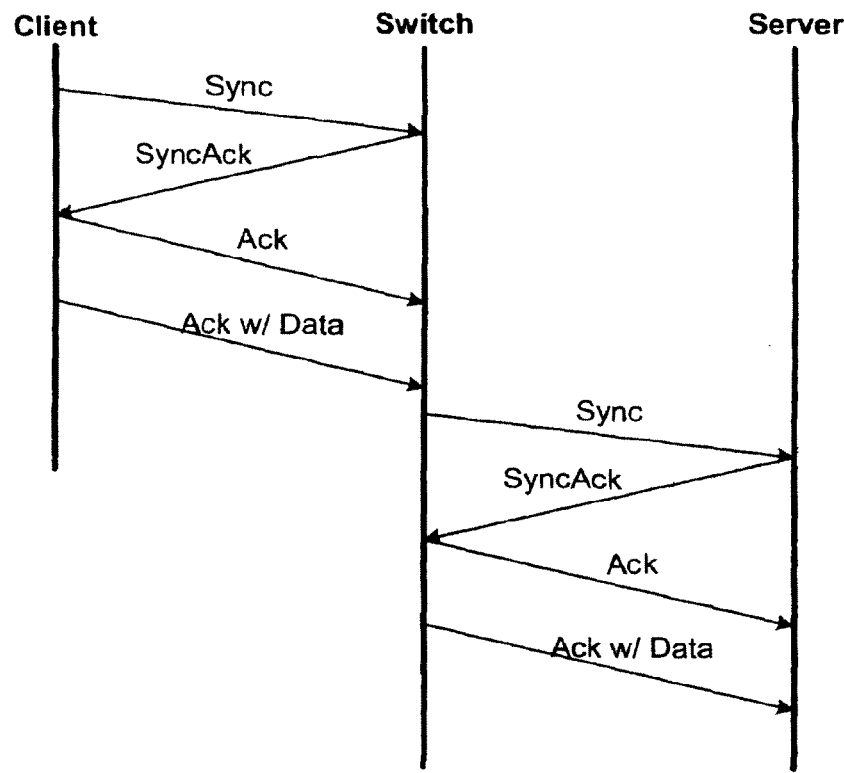
FIG. 17   *TCP Slicing*
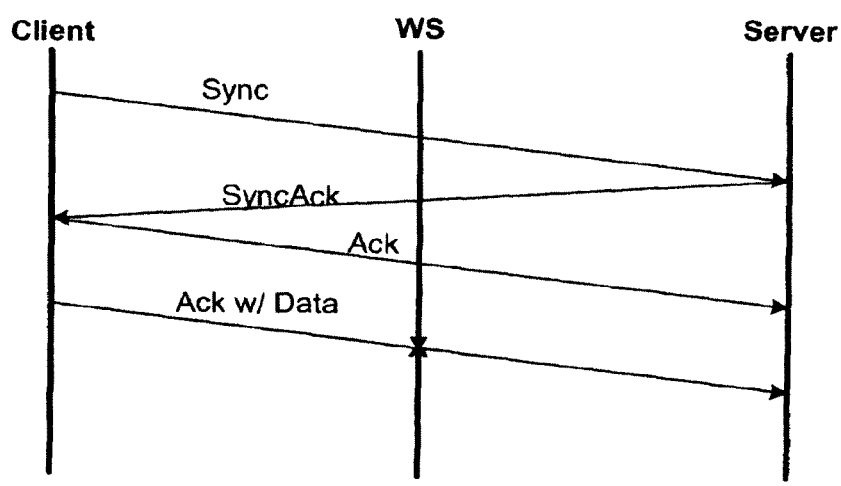
FIG. 18

INTELLIGENT SWITCHING OF CLIENT PACKETS AMONG A GROUP OF SERVERS

CROSS-REFERENCE TO RELATED APPLICATIONS

This application is a continuation of U.S. patent application Ser. No. 12/235,367, filed Sep. 22, 2008 and entitled "Intelligent Switching of Client Packets Among a Group of Servers", which is a continuation of U.S. patent application Ser. No. 11/218,444, filed Sep. 2, 2005, issued as U.S. Pat. No. 7,437,473 on Oct. 14, 2008 and entitled "Packet Switch and Method Thereof Dependent on Application Content", which is a continuation of U.S. patent application Ser. No. 09/883,852, filed Jun. 18, 2001, issued as U.S. Pat. No. 6,944,678 on Sep. 13, 2005 and entitled "Packet Switch and Method Thereof Dependent on Application Content", the disclosures of which are incorporated herein by reference.

FIELD OF THE INVENTION

This invention relates to client-server computing systems operating under the Internet Protocol, and more particularly to a switch and methods for switching client IP packets in a prescribed order to a server selected from a group of servers.

With the advent of the World Wide Web ("WWW"), a universal client-server computing platform has emerged on the Internet. A very large number of web-servers on the Internet are serving web applications, which interact with web browsers acting as clients. A web application is typically organized into a hierarchy of webpages, scripted in Hypertext Markup Language ("HTML") and/or Extensible Markup Language ("XML"). It operates under the Hypertext Transfer Protocol ("HTTP"). A web application could itself be a suite of applications, including access and manipulation of databases, media and other resources hosted on one or more servers.

The resources provided by the servers are called up by their respective Uniform Resource Locator ("URL"). Generally, an URL will contain an IP address that points to a server followed by additional pointers to files residing on the server. In the case of a web application, a client browser can therefore access a webpage or a link by its URL. In particular, the browser typically first accesses the web application by its website address, which is a portal address of the application, calling up a homepage with links to the hierarchy of webpages. For example, a commercial entity may create an on-line shopping site, www.onlineshop.com, for customers to browse and purchase merchandise on the Internet. The domain name address "www.onlineshop.com" is an alias for the IP address that points to where the application resides on the Internet.

One problem this new computing paradigm presents is the need for the server hosting a web application to meet the potentially huge demand from the clients. The global nature of the Internet has meant that at any time there could be millions of clients attempting to access the same web application. A common solution is to host the web application in a data center.

FIG. 1 illustrates a data center hosting the web application by means of a server farm. Multiple replicas of the web application are made available from a group of servers, known collectively as a "server farm". The data center provides a multiplicity of web servers and other related servers for hosting multiple copies of a web application and related resources. This architecture allows easy scaling of resource capacity to meet increased demand. When a client request comes in, a LAN/Web switch performs a load balancing function by connect it to one of the less busy servers in the group.

The URL of the website for the web application now points to the LAN/Web switch so that when a browser addresses the web application, the client packets are initially directed to the LAN/Web switch. The LAN/Web switch then switches the packets to one of the less busy servers in the data center based on load-balancing considerations. The switching is done using information associated with Layers 2-4 of the Open system Interconnection ("OSI") model, or the more specific Transmission Control Protocol/Internet Protocol ("TCP/IP").

FIG. 2 is a table illustrating the protocol layers of the OSI model, the corresponding TCP/IP protocol stacks, and the types of conventional switching and routing operable at each layer. According to the OSI model, each device on a network implements the seven OSI layers in a modular fashion. Starting with Layer 7, which is a software application at the top, each layer communicates with its immediate layers. As the layers get lower, the information to be sent out is increasing packaged for the specific hardware of the device, ending in Layer 1, which is the physical communication channel itself. Under TCP/IP, Layers 1-2 are implemented as a subnet (or MAC) stack, Layer 3 as the Internet (or IP) stack, Layer 4 as the transport (or TCPIUDP) stack, and Layers 5-7 as the Application stack. Each stack is usually implemented by a software and hardware combination. Typically, data is generated by a first network device and is processed down the protocol stacks, from Layer 7 to Layer 1, into a packet, with each stack adding a header to the packet. The packet can then be sent via a physical channel to a second network device. The second network device processes the packet up the stacks starting from Layer 1, and unwraps the respective headers after terminating them at their associated stacks. At Layer 7, the application data of the first device is retrieved for interaction with the application of the second device.

FIG. 3 illustrates the various headers of an IP packet. Each IP packet consists of a data portion for carrying the data payload and a header portion for carrying overhead information. The header portion is further partitioned into layer- or protocol-dependent headers. For example, a Layer 2 or MAC header includes a destination MAC address and a source MAC address that respectively specify the destination and source hardware addresses of a node in a subnet. On a LAN, an IP packet is directed to a destination device by its destination MAC address. A Layer 3 or IP header includes a source IP address and a destination IP address that respectively specify the IP addresses of the source and destination nodes on the Internet. On the Internet, an IP packet is directed to a destination device by its destination IP address. A Layer 4 or TCP header includes a source TCP port and a destination TCP port that respectively specify the port numbers used by the source node and the destination node. On a device, an IP packet is directed to a destination port by its port number. In general, transporting a packet from one location to other requires processing of Layers 2-4 header information.

The data portion of the IP packet contains Layer 7 information, which is data generated by the application. In web applications, the data will include HTTP headers. Since HTTP is not one of the basic OSI or TCP protocols, but a High level protocol associated with web applications, its header is therefore regarded as application data and therefore located in the data portion of the IP packet. The HTTP header includes an URL field for specifying the URL the packet is requesting. It may also include a cookie field for the application to communicate environmental information with the client.

As mentioned earlier, each device communicating on the Internet implements the TCP/IP stacks. For example, when a client computer running a browser requests a web page from a server, the client packets are typically routed by a number of routers and possibly a web switch before reaching the destination server. When a router intercepts the packets, it is processed from Layer 1 up to Layer 3, so that Layer 3 information such as the source and destination IP addresses can be extracted in order for the router to route the packet to the next device. When the packets get to a conventional Web switch, the packets are only processed from Layer 1 up to Layer 4. In general, the upper layer information can only be obtained after the all the lower layer stacks have been processed or "terminated". Thus, the upper or deeper layer information of an IP packet requires more processing to obtain.

FIG. 2 also lists the common types of routing and switching that can take place at the various layers. LAN switches, such as an Ethernet switch for a LAN operate at Layer 2 or the subnet stack of TCP/IP. Routers, operating at Layer 3 or the network layer, allow IP switching in which IP packets may be routed to a node having an IP address on the Internet. A router basically examines the destination IP address on a packet, looks up its routing table for the output port number in order to send the packet to the next node.

As mentioned earlier, a web switch is employed to switch an incoming client packet to one of many parallel web servers in a data center. In conventional implementations, its primary task is to perform a load-balancing function, i.e., to distribute an incoming packet to the least busy server among the server farm. This is accomplished by monitoring the load condition of each server, and dynamically changing the IP and MAC addresses of a packet so that the packet is directed to the least busy server.

In order to select the appropriate server, it is sometime necessary to consider the type of service being requested. For example, the data center may have a group of HTTP servers dedicated for web service; or a group of S-HTTP servers dedicated for secure web service; or a group of SMTP servers dedicated for Simple Mail Transfer Protocol service; or a group of FTP servers dedicated for File Transfer Protocol service. In that situation, it is necessary for a web switch to determine the type of service requested in order to select a server from the appropriate group. When the service is associated with a particular transport protocol, Layer 4 header information will be useful in helping to select an appropriate server.

FIG. 4 illustrates conventional TCP port assignments for some of the more standard services. The Layer 4 header of a packet contains the destination TCP port number. By convention if the destination TCP port number is 80, it can be assumed that the packet is associated with HTTP protocol and therefore a web application. Similarly, if the port number is 25, the service is assumed to be SMTP, or if the port number is 20, the service is assumed to be FTP, etc.

Thus, existing web switches are capable of switching an incoming packet to the most appropriate server, based on server load conditions and/or Layer 4's transport layer information. More recently, there have even been suggestions of more refined load balancing based on Layer 7, or application layer information, taking into account information derived from the HTTP header, such as URL and cookie.

Also, there have been suggestions of making web switches capable of switching with some notion of Quality-of-Service ("QoS"). This is in view of certain applications, such as those involving Voice-Over-IP ("VoIP") service under the H.323 standard, requiring a minimum standard for connection stability, low latency and bandwidth. The suggested solution is to provide dedicate VoIP servers that can provide the necessarily quality of service for this purpose, and to have the web switch recognize VoIP packets through Layer 4 information in order to switch them to the VoIP servers. Thus QoS is provided essentially by switching the packets associated with a special application to a server dedicated to serving such special application.

Generally, load-balancing schemes enable the capacity of a website to be scaled to meet demand, and existing QoS schemes allow switching to a dedicated server that can provide the required quality of service. However, due to the enormous number of clients on the Internet that could potentially access a website, there will be times when the budgeted capacity of a website is exceeded. This is especially the case during certain peak times when a website could experience spikes in demand. For example, an online merchandising website could be especially busy during holiday seasons when the demand could increase by orders of magnitude. Under those peak demand circumstances, no amount of load balancing will suffice since all the available servers in the server farm are already fully committed. When additional requests arrive, the web switch can only make a best effort attempt to deliver the packets to the saturated servers.

As the servers becomes busier with more requests, the quality of service decreases as a nonlinear functions of the number of requests. With existing web switch capabilities, once the server farm is saturated, the quality of service deteriorates drastically for all clients accessing the website. There is no provision for distinguishing clients of differing importance or to accord clients of high importance preferential access. Nor is there provision for ensuring sufficient server headroom so that clients of high importance will be served on demand. For example, this would be of significance for an online merchandising website during holiday seasons when excessive traffic may reduce the website to a crawl or render it totally incapacitated. It would be desirable to give preferred customers preferential access. A preferred customer may be one who is on a shopping cart page as compared to a regular customer who is merely browsing the catalog. Conversely, when certain client packets are deemed less preferential, it would be desirable to have a way to identify them and accord them with the appropriate quality of service, of lack thereof. In security applications, it would be desirable to be able to identify those packets that are "packet non-grata" and have the switch direct them elsewhere or to drop them altogether.

SUMMARY OF THE INVENTION

According to one aspect of the present invention, a content-aware application switch and methods thereof intelligently switches client packets to one server among a group of servers in a server farm. The switch uses Layer 7 or application content parsed from a packet to help select the best server and to prioritize the transmitting of the packet to the server.

In an exemplary embodiment of the invention, a method includes maintaining a server load metric for each server in a group of servers; parsing application content from a packet; selecting a destination server from the group of servers, wherein selecting the destination server is dependent on the server load metric for each server, assigning a priority to the packet, the priority being dependent on the application content; and dropping the packet if the priority comprises at least one of a predetermined type.

The application switch comprises a buffer controller, a packet classifier, a set of tables, and a transmit controller. The buffer controller is responsible for receiving, buffering and transmitting a packet on route to a server. The packet classifier parses the Layer 7 or application layer content from the packet and assigns to it a predefined content class. The assigned content class identifies the nature of the application associated with the packet, and in combination with the set of tables, provides application-specific information for the transmit controller to perform load balancing and Quality-of-Service ("QoS") control.

In a preferred embodiment, applications and therefore packets associated with them are assigned priorities as either being HIGH, MEDIUM, or LOW. A QoS controller included in the transmit controller maintains a set of packet queues for each server among the group of servers. Each set contains three queues corresponding to the three priority types.

The queues are such that the lower priority queues are held back in response to the workload of its server reaching a predefined level.

The QoS controller schedules transmission of the packets by picking the packets off the queues, such that HIGH priority queues are picked before MEDIUM priority queues, and MEDIUM priority queues are picked before LOW priority queues. In addition, when picking the MEDIUM and LOW priority queues, the QoS controller is cognizant of the current workload of the server and mindful that certain server headroom is maintained. This provides provisioning of server headroom for high priority packets during switching of lower priority packets.

The invention provides improved load-balancing and Quality-of-Service control tailored to the application being switched. QoS control is effected at the switch on a packet-by-packet level and is applicable to any server. This provides more flexibility and control compared to conventional implementations where applications requiring a high quality of service are identified by their transport protocol and then directed to dedicated servers.

According to another aspect of the invention, a slow-start method assigned an initially boosted server load metric to a server newly added to a group of servers under load balancing. The method comprises boosting the new server load metric to decrease, over a predetermined period, the disparity between the server load metrics of the new server and that of other servers in the group of servers. This alleviates the problem of the new server being swamped initially due to a very low load metric compared to that of others in the group of servers.

In a preferred embodiment, the boosting is halved at predetermined intervals until the boosting is reduced to unity when the disparity between the server load metrics is less than a predetermined amount.

According to yet another aspect of the invention a switching method dependent on Layer 7 content is provided that avoids delayed binding in a new TCP session. Layer 7 content is not available during the initial handshaking phase of a new TCP session. The method uses the Layer 7 content from a previous session as an estimate to help select the server and uses a default priority to scheduling the transmitting of the handshaking packets. Updated Layer 7 content available after the handshaking phase is then used to reset the priority for the transmit schedule and is available for use in load balancing of the next TCP session. The inventive method enables content-aware switching without incurring delay and excessive processing while initially waiting for content to become available in order to make switching decisions.

Additional objects, features and advantages of the present invention will be understood from the following description of its preferred embodiments, which description should be taken in conjunction with the accompanying drawings.]

BRIEF DESCRIPTION OF THE DRAWINGS

FIG. 6 is a table illustrating the various TCP/IP protocol stacks and OSI layers and associated messages or information the application switch employs to perform switching.

FIG. 9 is a schematic illustration of the information carried in a packet tag.

FIG. 10A illustrates a content dictionary containing a set of predefined patterns indexed by content class.

FIG. 10B illustrates a policy table containing a set of predefined policies indexed by content class.

FIG. 10C illustrates a server property table.

FIG. 10D illustrates a server state table.

FIG. 17 illustrates the handshaking at the beginning of a TCP session between a client, an intermediate switch and a server under the TCP splicing scheme.

FIG. 18 illustrates the streamlined TCP process of the present invention.

DETAILED DESCRIPTION OF THE PREFERRED EMBODIMENTS

Content-Aware Application Switch

According to one aspect of the present invention, a content-aware application switch enables switching a client packet to a server among a group of servers, where the selected server and the priority of the packet are dependent on the content carried in the packet.

Figure 1:
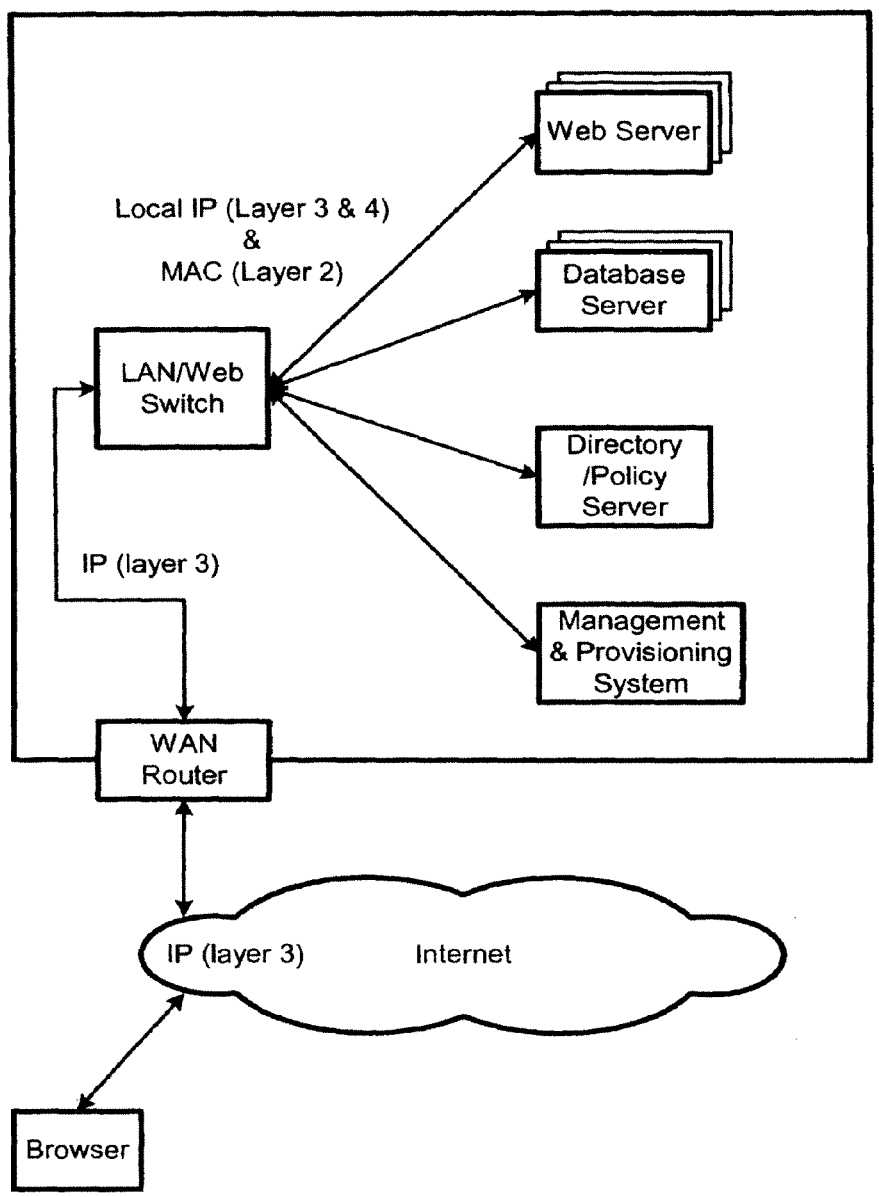
FIG. 1 illustrates a data center hosting the web application by means of a server farm.
Figures 2, 3:
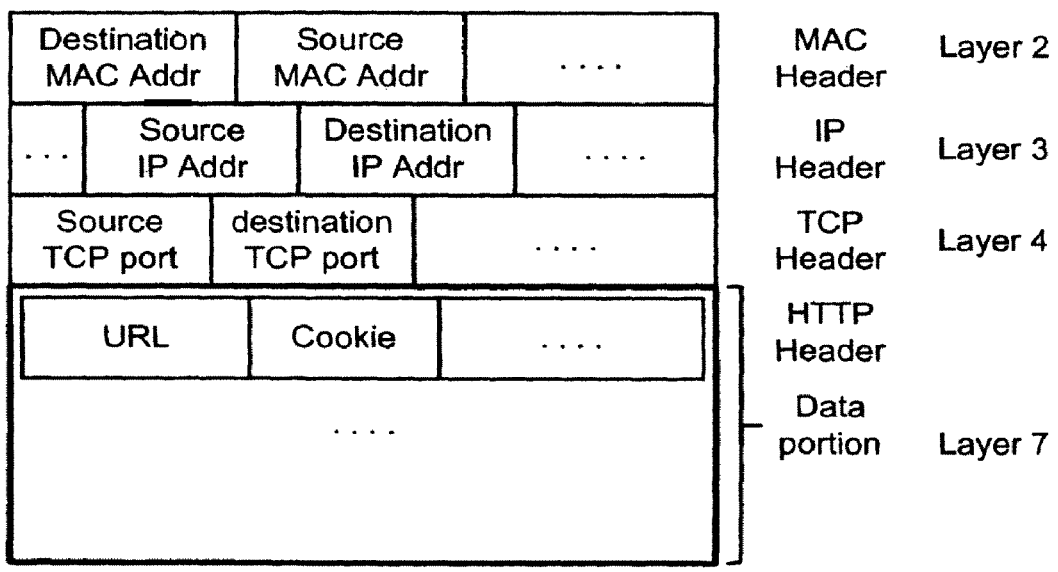
FIG. 2 is a table illustrating the protocol layers of the OSI model, the corresponding TCP/IP protocol stacks, and the types of conventional switching and routing operable at each layer.
FIG. 3 illustrates the various headers of an IP packet.
Figure 4:
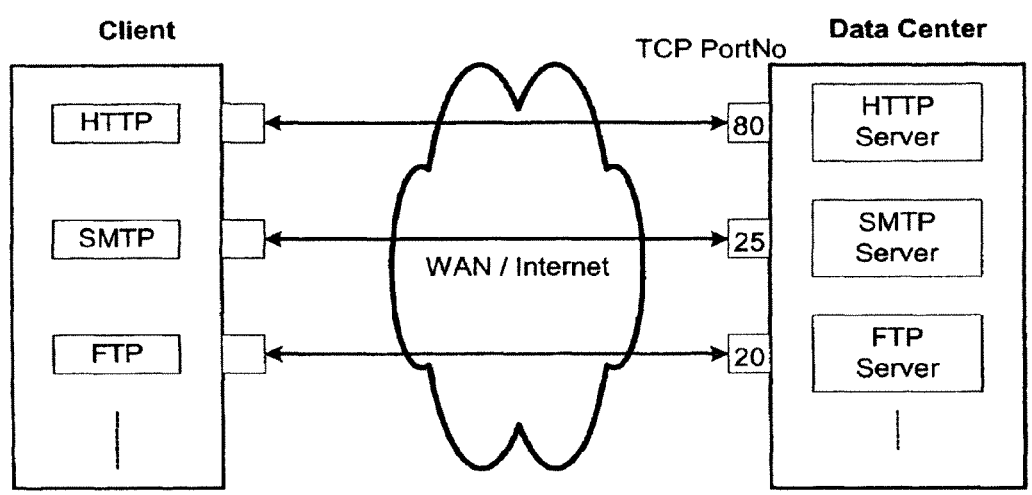
FIG. 4 illustrates conventional TCP port assignments for some of the more standard services.
Figure 5:
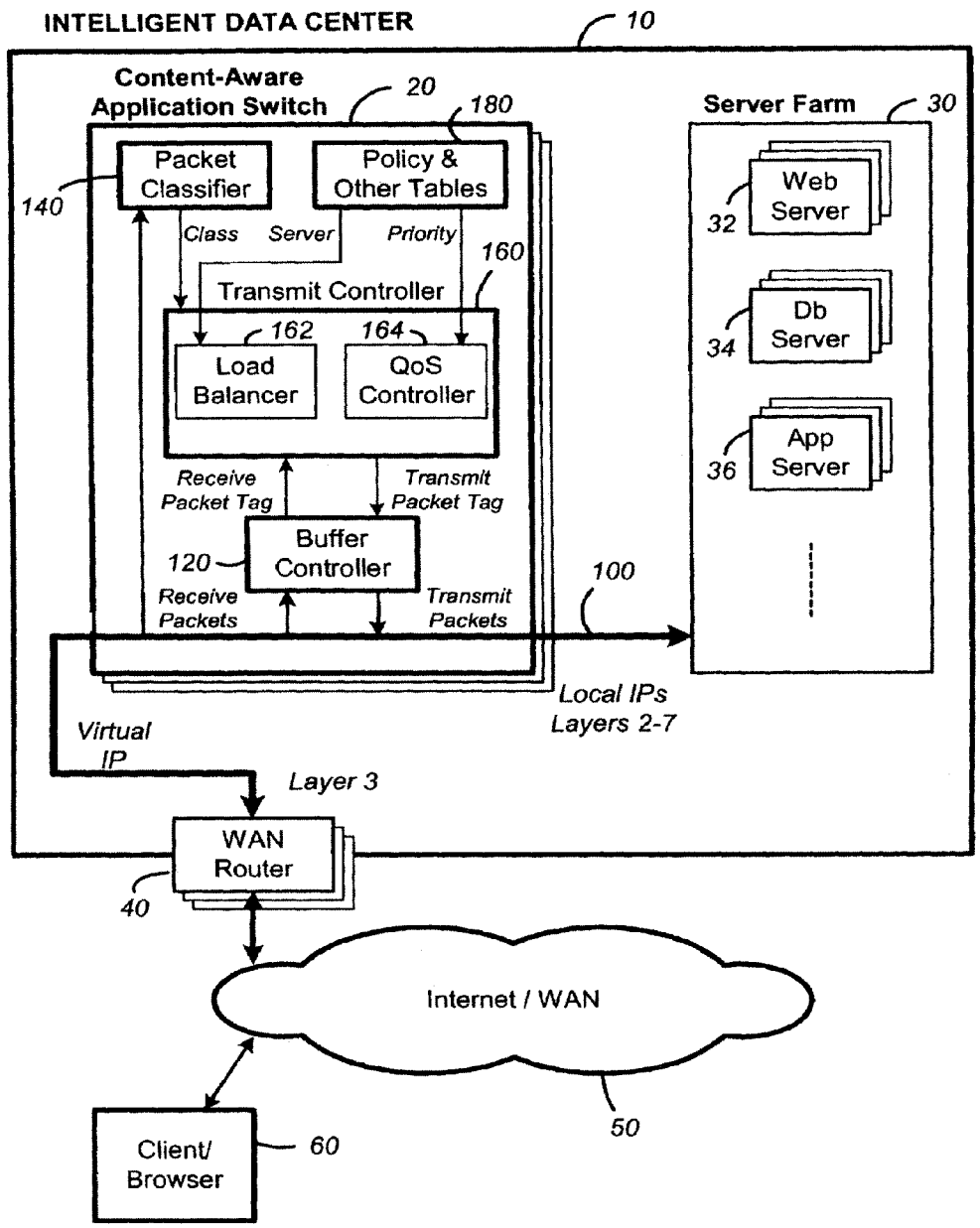
FIG. 5 is a functional block diagram illustrating schematically a content-aware application switch operating in an intelligent data center, according to a preferred embodiment of the present invention.

FIG. 5 is a functional block diagram illustrating schematically a content-aware application switch operating in an intelligent data center, according to a preferred embodiment of the present invention. An intelligent data center 10 is implemented by the deployment of a content-aware application switch 20 to switch between servers in a server farm 30. The server farm 30 comprises a group of web servers 32 for hosting replicas of a web application to be deployed on the Internet 50. The server farm optionally includes other servers, such as database servers 34 and media servers 36 for providing resources that may augment or be required by the particular web application being deployed. Browsers on the Internet, such as a browser 60 running on a client computer, can access the web application hosted in the data center 10 via a WAN (wide-area network) router 40.

A browser accesses a web application by the URL pointing to the website hosting the web application. In the simple case when a web server is accessible directly from the Internet, the URL for the website will be the IP address of the server. In the case of the data center, where the web servers are behind the application switch 20 and not directly accessible, the URL for the website is a virtual IP address that actually points to the application switch. Each server in the server farm 30 has its own IP address, which is a local IP address accessible only within the data center. The virtual IP address enables the client packet to be delivered to the switch. The switch selects a server and delivers the packet to the selected server by addressing the server's local IP address. This switching process involves modifying the destination IP address in each packet header from that of the switch to that of the selected server. Likewise, the hardware MAC address in the packet header is modified.

The application switch 20 basically receives packets from clients on the Internet, examines the content of the packets, and based on the content, prioritizes the packets and selects appropriate servers to send the packets to. The application switch 20 comprises an IP bus 100 that enables IP communications with the Internet 50 and the server farms 30. A buffer controller 120 temporarily stores packets passing through the application switch.

A packet classifier 140 snoops receive packets from the IP bus 100 so as to examine the content in each packet and classify the identified content pattern as one of predefined content pattern classes.

A transmit controller 160 uses the assigned content class to look up a set of tables 180 to determine transmit instructions for each packet. Ultimately, the transmit instructions determine which server the packet is to be directed to, and in what order. The transmit controller includes a load balancer 162 and a QoS controller 164. The load balancer 162 selects a server that can best serve the request associated with the packet based on the content class, server farm configuration and the current loads of the servers. The QoS controller 164 prioritizes each packet based on the content class and the predefined policy for each class.

Once the transmit instructions have been determined for each packet, the transmit controller cooperates with the buffer controller 120 to release the temporarily stored packets to the selected server according to their determined priority.

Thus, it can be seen that packets are routed from the client 60 to the application switch 20 using Layer 3 information. From the switch to a selected server, Layer 4-7 information is used to select a server and set priority, and Layers 2-4 information is used to deliver the packet to the selected server.

FIG. 6 is a table illustrating the various TCP/IP protocol stacks and OSI layers and associated messages or information the application switch employs to perform switching. As mentioned in the background section, a conventional web switch operates within a data center to switch packets to one of a group of servers based on load-balancing considerations. A server is selected based on how busy each server is and what type of request is carried by a packet. The type of request carried by a packet can be determined by examining Layers 4-7 message.

The content-aware application switch 20 shown in FIG. 5, operates in a similar environment as a web switch. It switches packets based on information or messages associated with Layer 7 as well as those of lower layers. However, unlike a web switch, not only is it aware of Layers 2-7 messages, it also uses this information to prioritize the packets as well as to select the most appropriate server. In other words, the application switch performs QoS control and load balancing based on application-related information.

The application-related or Layer 7 message carried in a packet includes HTTP header and other HTTP payload such as data or other personalized information. The information can be used to make switching decisions based on QoS considerations. For example, at an online merchandising website, the customer who is actually trying to buy an item can be distinguished from another who is merely browsing a catalog by the web page they are currently requesting. This information can be determined from the URL contained in the HTTP header, since it actually points to the current webpage. Similarly, the packets from a preferred customer may be identified by the cookie contained in the HTTP header. Based on a set predefined policies, the packets can be prioritized, with the higher priority ones getting better quality of service ("QoS").

Figure 7:
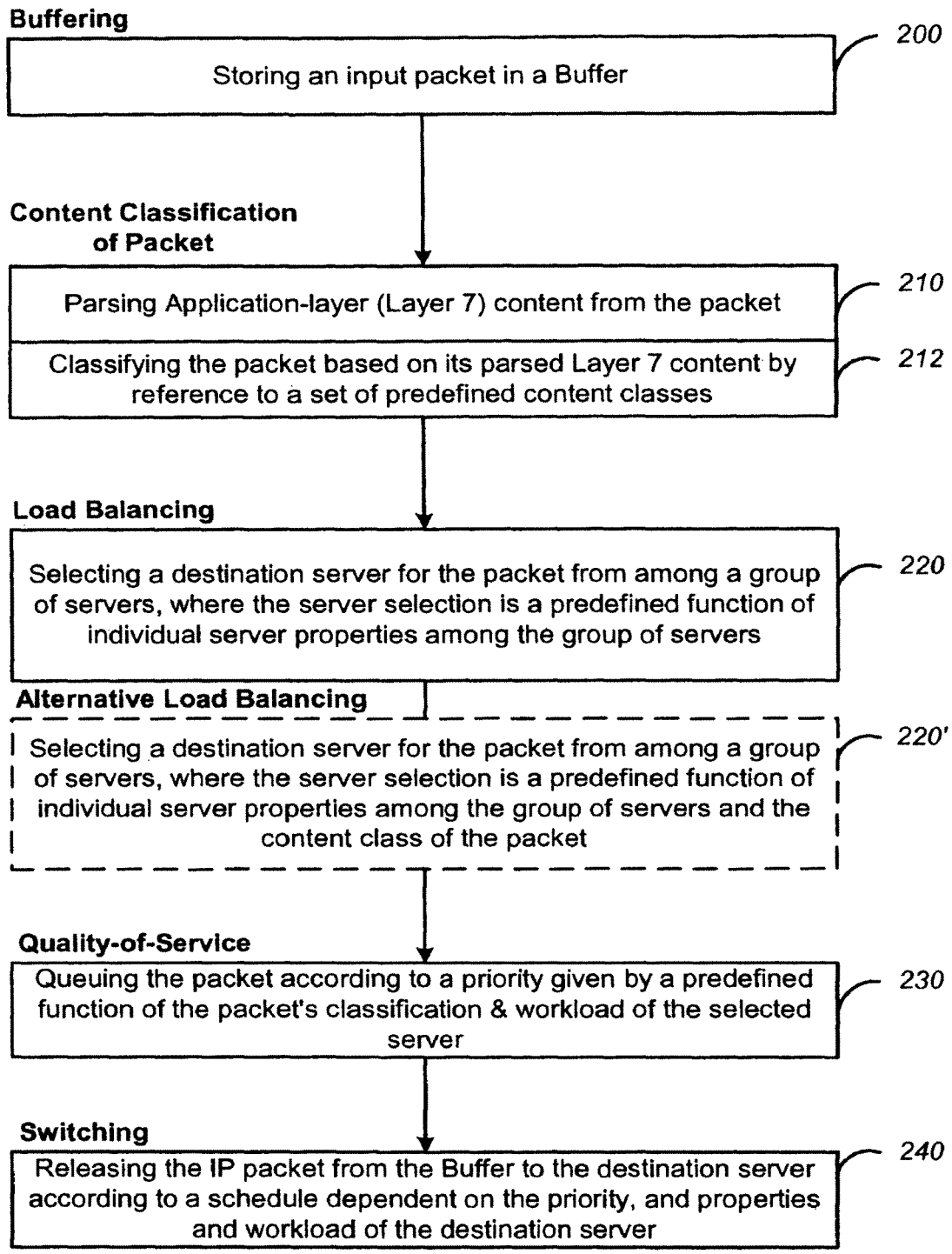
FIG. 7 is a flow diagram illustrating a method of switching prioritized packets to one of a group of servers.

FIG. 7 is a flow diagram illustrating a method of switching prioritized packets to one of a group of servers.

Buffering:

Step 200: Store an input packet in a buffer. The input packet is typically associated with a client request.

Content Classification:

Step 210: Parse out the Layer 7 content from the packet. Lower layer information is also parsed out to obtain various addresses, but Layer 7 content provides information about the application associated with the input packet.

Step 212: Assign a content class to the packet based on its parsed content by reference to a predefined set of content class definitions.

Load-Balancing:

Step 220: Select a destination server for the packet from among a group of servers, where the server selection is a predefined function of the individual server properties, including server loads, among the group of servers.

Alternatively,

Step 220': In another embodiment, select a destination server for the packet from among a group of servers, where the server selection is a predefined function of the individual server properties among the group of servers and the content class of the packet. The dependency on content class allows more refined load balancing. For example, the content class assigned to the packet allows identification of the group of eligible servers for serving the application, and also the estimated load the application placed on the selected server.

QoS Control:

Step 230: Queue the packet according to a priority that is given by a predefined function of content class.

Switching:

Step 240: Release the packet from the buffer to the designation server according to a schedule that depends on the assigned priority and the properties and workload of the destination server.

In the preferred embodiment, all packets belonging to the same TCP session are assigned similar transmission characteristics and are therefore treated as a group. Classification by the packet classifier 140 need only be performed on a sample packet of the group. The transmit controller 160 then assigns the same classification to the rest of the packets in the same TCP session. In this way, it has been estimated that the packet classifier need only process five percent of all packet traffic. A TCP session can be identified by the unique combination of Source IP Address (Layer 3 header) and Source Port Number (Layer 4 header).

Figure 8:
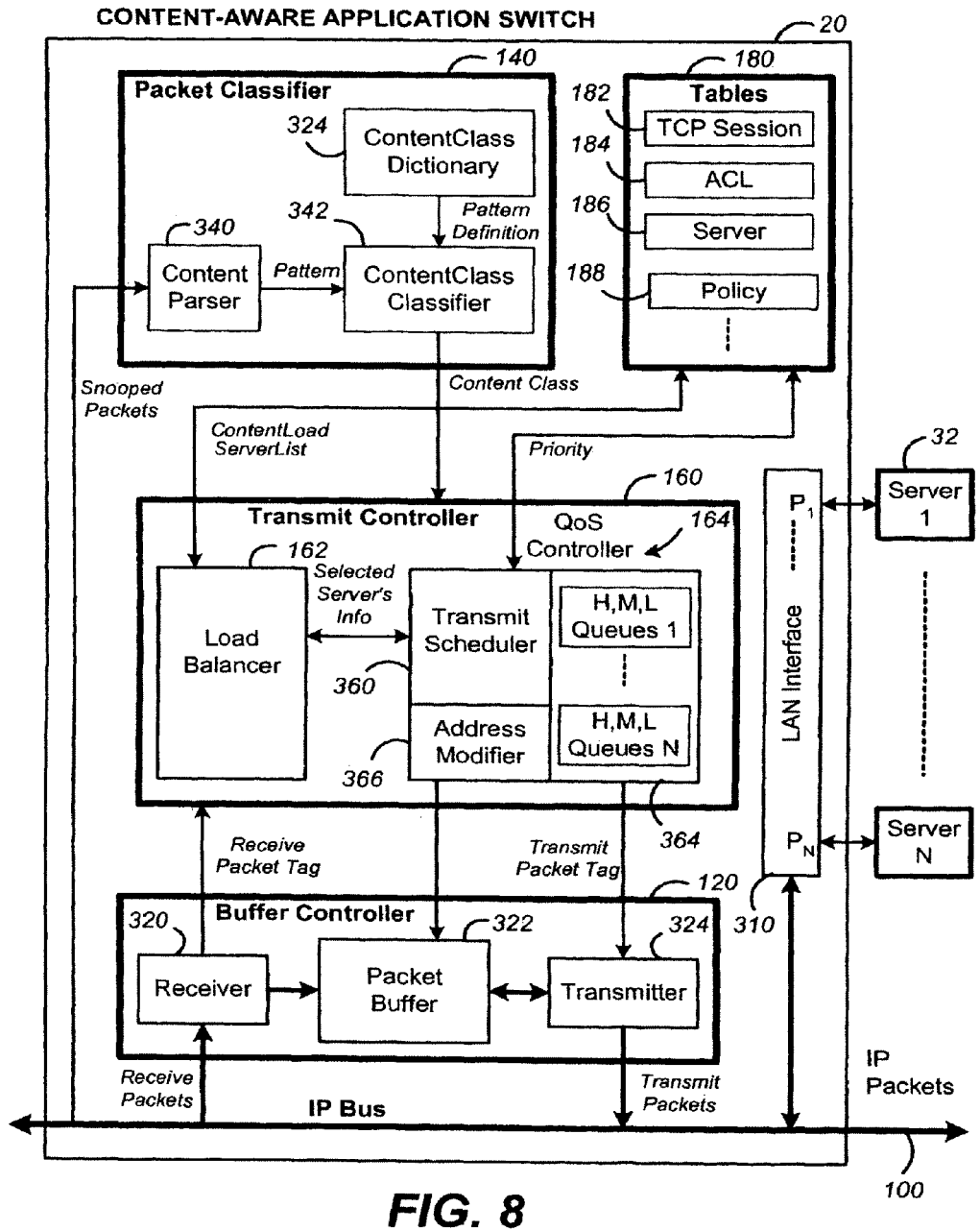
FIG. 8 shows the components of the application switch of FIG. 5 in more detail.

FIG. 8 shows the components of the application switch of FIG. 5 in more detail. The application switch 20 uses the IP bus 100 to communicate with the Internet 50 on one side and the server farm 30 on the other side (see FIG. 5). In one preferred embodiment, the IP bus interfaces on the Internet side (ingress port) with a wideband network interface, such as a 1 Gbps Ethernet port (not shown). On the server farm side (egress port), the IP bus interfaces with N (e.g., N=8) 10/100 Mbps Ethernet ports 310, allowing connections to N servers 32. This provides a throughput of 1.28 Gbps full duplex across the application switch. In general N should be a number such that the throughput on the ingress port is commensurate with that of the egress port.

Buffer Controller

Packets entering the application switch 20 are temporarily stored in the buffer controller 120. The buffer controller comprises a receiver 320, a packet buffer 322 and a transmitter 324. On the ingress side, client packets arriving from the Internet are picked up by the receiver 320 from the IP bus. The receiver stores the packets in the packet buffer 322 and also creates a packet tag for each stored packet. The packet tag is a token for the stored packet and is used by the transmit controller to assign transmit instructions to the stored packet.

FIG. 9 is a schematic illustration of the information carried in a packet tag. It comprises a Packet ID field, a Buffer Address field, a Priority field, a Previous Packet ID field, a Next Packet ID field, and a Selected Server field. Packet ID serves as an index to the stored packet. Buffer Address gives the memory location of the stored packet. Priority is determined from a classification of the packet content and is used to set the sending order of the packet to the selected server. The sending order is encoded in the linked list fields, Previous Packet ID and Next Packet ID. Selected Server is the address (i.e. port number) of the selected server. The linked list fields and Selected Server field contain transmit instructions that are assigned by the transmit controller.

Tables

Returning to FIG. 8, it will be understood that various components of the application switch communicate with each other by well known means of internal buses, processors, memories and other glue logic, and are not explicitly shown. Shown explicitly are those communication paths that help to illustrate functional relationships. In particular, where information is stored and processed by a number of components, it is preferably stored in the set of tables 180.

The tables include a TCP session table 182, an ACL (access control list) table 184, one or more server table 186, a class policy table 188 and others. These tables are accessible by the various components of the application switch and will be described more fully in connection these components later. In the preferred embodiment, the tables are stored in non-volatile memory and loaded into random access memory ("RAM") during operation.

The TCP session table 182 keeps track of TCP sessions. When a packet is received into the application switched, it is checked against the TCP session table to see if it belongs to an existing TCP session. If the packet is part of an existing TCP session, it will be assigned transmission instructions similar to other packets of the same TCP session. If the packet does not match any existing TCP session, a new TCP session will be registered in the TCP session table 182.

The ACL table 184 is a listing of access control instructions versus content class. Essentially, it allows a user or an administrator to control access based on parsed Layer 2-7 information. In one embodiment, it is incorporated into the class policy table.

The class policy table 188 allows a user or an administrator to set policies or business rules to different content classes. In the preferred embodiment, a priority is assigned to each content class.

Packet Classifier

As a receive packet is taken up by the receiver 320, a copy of it is snooped by the packet classifier 140. The packet classifier comprises a content parser 340 that parses out content from the various header fields and data portion (Layers 2 to 7) of the a packet. A content class classifier 342 recognizes the parsed content as one of a set of predefined patterns and classifies each pattern by reference to a content class dictionary 344.

FIG. 10A illustrates a content class dictionary containing a set of predefined patterns indexed by content class. The content class dictionary 344 is a table stored in memory that can be updated by a user or administrator. In one embodiment, it is included in tables 180.

Returning to FIG. 8, the content class classifier 140 assigns to the packet a content class, which is then communicated to the receiver 320 and the transmit controller 160.

Basically, Layer 2-4 information parsed by the packet classifier is used by the receiver 320 to make a preliminary determination of what to do with each packet. For example, the classification on (Layer 2-4) headers is useful for screening out uninterested web traffic. This includes:

a. Checking destination MAC address for Layer 2 switching;

b. Setting an Access Control List ("ACL") by looking at TCP/IP headers, and returning a flag for reject or allowed packet traffic;

c. Identifying uninterested web traffic by looking at TCP/IP headers, such as user specified VIP and/or web service port numbers, and returning a flag to indicate uninteresting web traffic and forwarding output MAC port number;

d. Identifying management traffic by looking at TCP/IP headers, such as the appearance of the actual IP address of the application switch and/or network management port numbers, and returning a flag to indicate management traffic and forwarding output MAC port number.

In a preferred embodiment, Layer 7 information is also examined for making a preliminary determination of what to do with each packet. In particular, the ACL is also controlled by application layer information where packets carrying certain class of content are accepted, rejected or redirected to a predetermined location.

If the receiver 320 determines from the Layers 3-4 information that the packet is not related to web traffic, the transmit controller 160 will not need the application layer (Layer 7) information from the packet classifier 140. It will be notified by the receiver to process the transmit instructions of the packet accordingly. Otherwise, the transmit controller will take the application layer information into account.

The classification on application layer (Layer 7) content makes it possible to assign, in combination with the policy table 188, more refined transmit instructions for a packet. In general, the inbound packets are classified based on at least three categories of information. The first one is related to the nature of the application. Different applications will be treated differently based on their business values. Different application can be identified by the associated URL path information. The second is related to client's history. Based on the historical behavior of a client, the client can be assigned a priority. A specified cookie field can be used to accumulate client history information, and be examined to classify the inbound packets. The third category is related to client's browsing status. The business value associated with clients in different browsing stages will be different. A client in a buying mode who has put items into the shopping cart and/or provided his/her credit card information has higher business value than the clients in random surfing mode. The different browsing stages can be determined by examining the URL paths (i.e., the web pages being pointed to) and/or from specified cookie fields established to identify clients in different browsing stages.

The application layer classification therefore includes checking URL and Cookie values, and return URL and Cookie Pattern index based on these values. From the URL, the HTTP request method (GET, HEAD, POST, etc.) is also examined. Policy can be set to disable certain methods, like PUT or DELETE. Examples of other possible URL patterns that may be checked, include:
TABLE-US-00001 GET/subdir/filname.html (or HEAD, POST, PUT, etc.) GET/subdir/*.gif GET/(all .cgi, .bin, and .exe files) GET/*.asp?userid=1234 (or all userid between 100 and 500) Host: www.companyname.com Referer: http://www.companyname0.com/subdir/filename.html Examples of possible Cookie patterns that may be checked, includes:
TABLE-US-00002 Cookie: *; userid=1234; (or all userid between 100 and 500) Cookie: *; shoppingcartexists=yes; ***; shipping=fedex.

In a preferred embodiment, the packet classifier 140 is implemented with the aid of a PAX.port 1100 Classification Processor manufactured by Solidum Systems Corp., Scotts Valley, Calif., U.S.A. Classification is only performed on packets from the Internet side, i.e., ingress traffic, which will inspect all the packets at the speed of 500 Mbs (312K packet per second (pps), assuming 200 bytes of average packet size) and parsing of all Layer 2 to 7 fields.

Transmit Controller

The transmit controller's job is to use information parsed from a packet to assign transmit instructions for the packet in order to stage the packet for transmission. In the preferred embodiment, the transmit controller performs an initial application-layer security screening by checking against the ACL table 184. Dependent on the determined content class of the packet, the ACL table may prescribe that the packet is to be dropped, or redirect to a predetermined location, or other actions. On the other hand, if the ACL table grant access for the packet to be switched to a destination server among the server farm, the transmit controller will invoke the load balancer 162 and the QoS controller 164 to provide transmit instructions for the packet.

In the preferred embodiment, the transmit instructions include specifying which destination server the packet is to send to and with what priority. The destination server is determined by the load-balancer 162 component of the transmit controller and the priority is determined by the QoS controller 164 component. These determinations are made by reference to both the content class for the packet and tables containing server and priority information.

FIG. 10B illustrates a class policy table containing a set of predefined policies indexed by content class. The policy table 188 is a table stored in memory that can be updated by a user or administrator. It basically codifies the relative importance of a packet with a given content class, based on business and other considerations. This is implemented by a priority assigned to each class. In a preferred embodiment, the priority falls into one of three types: HIGH, MEDIUM, and LOW. In another embodiment, the priority type also includes REJECT, which means the packet is to be dropped. This will provide an alternative implementation of application-layer security control. For expediency, the table also contains a Server Group field and a Class Weight field. The Server Group field yields, for each class, a list of eligible servers eligible to service the class. The Class Weight field provides a relative estimate of the load presented to a server by applications associated with this class. In the example shown in FIG. 10B, the class policy table defines Priority, Server group, and Class Weight as individual functions of content class.

FIG. 10C illustrates a server property table. The server property table is part of the server table 186 shown schematically in FIG. 8. It lists all servers in the server farm and their properties and settings. The server properties include: the server's IP & MAC addresses; the maximum number of connections that the application switch can establish with the server; the default server weight, which is an integer number indicates the relative power of the server, a LOW margin; and a HIGH margin. The default server weight provides a weighted measure of the server intrinsic capacity. The LOW and HIGH margins will be described in connection with QoS control later.

FIG. 10D illustrates a server state table. The server state table is a dynamic part of the server table 186 shown schematically in FIG. 8. The server state table stores server load metrics that include: CurrentConnections; CurrentLoad; DynamicServerWeight and a count, k. The CurrentConnections indicates the current number of connections the application switch has established with the server. The CurrentLoad is a weighted summation of all current connections, i.e. a summation where each connection is weighted by the default server weight and also the class load (see FIG. 10B) associated with each connection. The DynamicServerWeight and the count, k will be described in more detail later in connection with a slow-start server-selection method for a newly added server.

To determine a destination server for a packet, the load balancer 162 (FIG. 8) uses the content class obtained from the packet classifier 140 to look up the policy table 188 for a server group and a class load. The load balancer then selects one server from the server group based on load-balancing considerations. The load balancer references the various server tables 186 and takes into consideration the properties and the server load metrics of each server in the server group in order to select a server best able to fulfill the request associated with the packet in question.

At least four types of load-balancing schemes are applicable. The first three types are simpler, without considering the number of existing connections on each server. For example, the first type is "Round Robin", which chooses a server among a group in turns. The second is "Weighted Round Robin", which is similar to "Round Robin", but each server is weighted by its DefaultServerWeight (FIG. 10C). The third is "Weighted Distribution", which is similar to "Weighted Round Robin" in that the servers are weighted, but it chooses a server by random selection rather than going around the group in turns.

The fourth type of load-balancing scheme is "Weighted Least Connection", which is the preferred scheme. It involves more computations but provides a more refined balance. Basically, it selects a server with the minimum number of weighted connections (i.e. CurrentLoad). A weighted connection takes into consideration that different class of requests presents different load on a server as represented by the ClassWeight value given in the policy table of FIG. 10B. It also takes into consideration that each server also has a weight (represented by DefaultServerWeight in FIG. 10C) which allows some server to have more connections than others.

Figure 11:
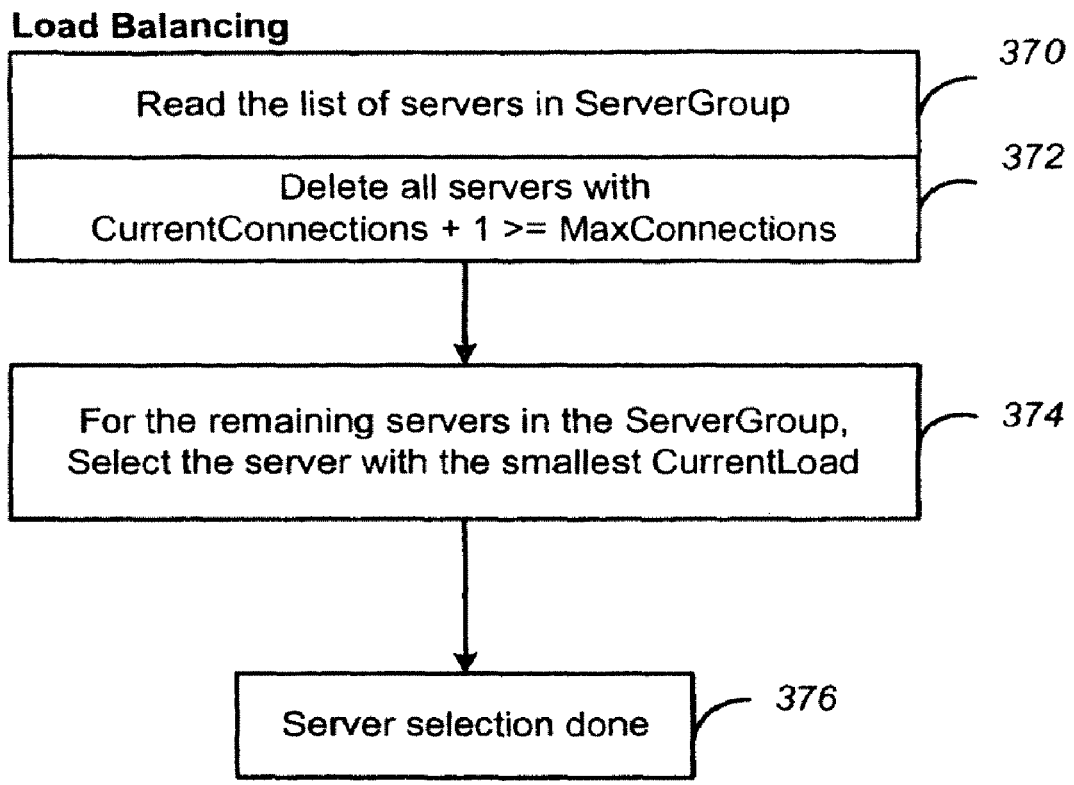
FIG. 11 is a flow chart illustrating a load-balancing scheme based on weighed least connection.

FIG. 11 is a flow chart illustrating a load-balancing scheme based on weighed least connection.

Step 370: Read the list of servers in ServerGroup. ServerGroup is the group of servers predetermined to be eligible for serving packets of a given content class (see. FIG. 10B).

Step 372: Delete all servers with CurrentConnections+ 1>=MaxConnections. All servers in the group that are already connected to the maximum need not be considered.

Step 374: For the remaining servers in the ServerGroup, select the server with the smallest CurrentLoad.

Step 376: End.

Conventional load balancing mechanisms take into account only server utilization factor. If all servers are busy, no one can get in since it gives no preferential treatment to traffic with higher business value. The present application switch 20 is capable of prioritizing all inbound packets (i.e., packets on ingress traffic) according to predefined business values.

In the preferred embodiment, the QoS controller 164 (FIG. 8) sorts all inbound packets into three priority types, High, Medium, and Low, and place packets of different types into queues of different priority levels, based on the business values assigned to the traffic. Packets in different type queues will be managed differently. When all servers are busy, the application switch will give preferential treatment to the High priority inbound packets, and delay and/or discard Medium and Low priority inbound packets. Using this mechanism, the application switch can allocate more server resource to traffic with higher business values.

Figure 12:
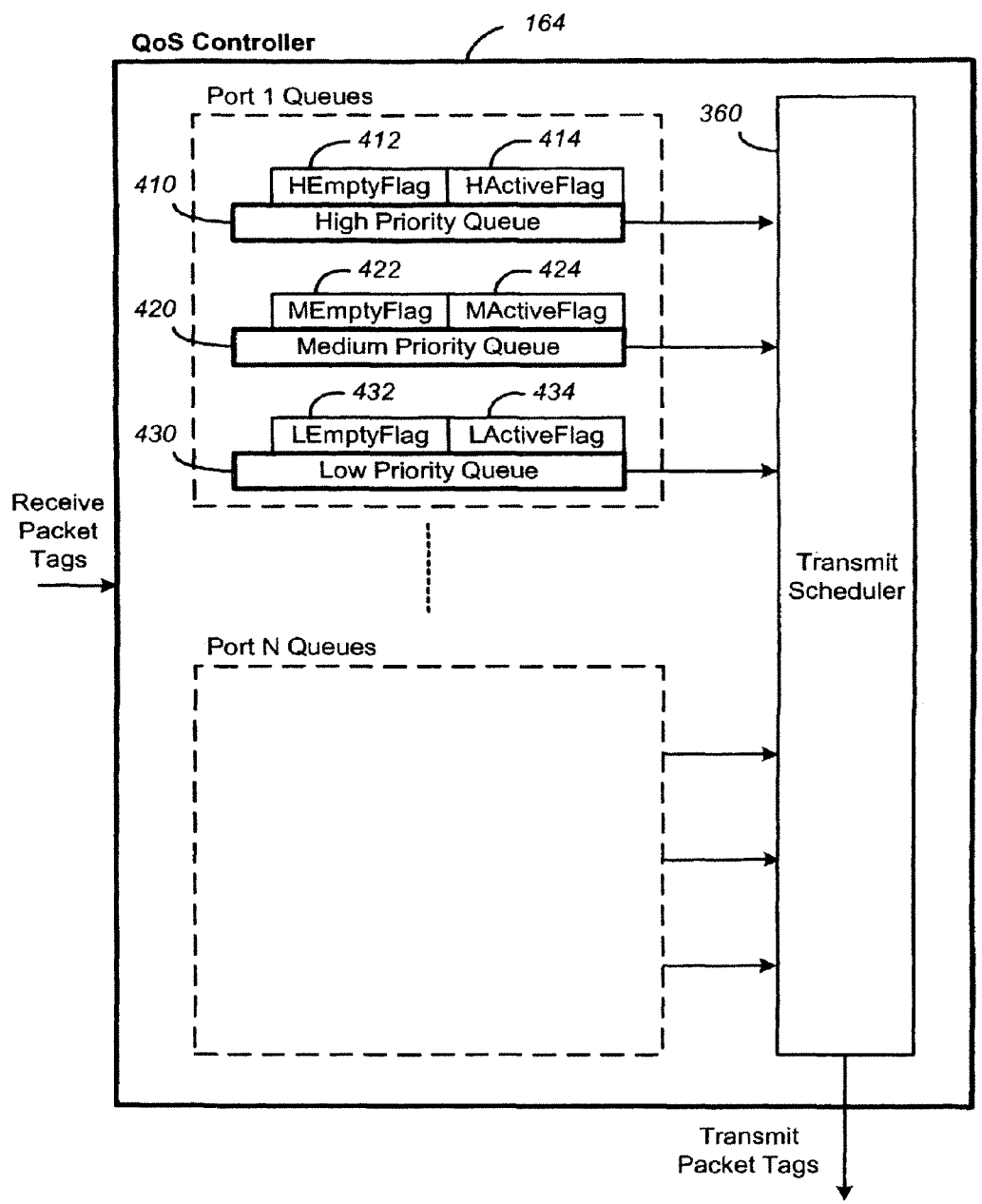
FIG. 12 illustrates schematically the QoS controller of FIG. 8 in more detail.

FIG. 12 illustrates schematically the QoS controller of FIG. 8 in more detail. As packets are received by the Application switch 20, their corresponding packet tags are being handled by the transmit controller 160 (see FIG. 8). The QoS controller 164 effectively sorts the packet tags into a series of queues. There is one set queues for each of the N servers. Each set of queues, such as that for Port 1 connecting to server 1 (see FIG. 8), comprises a High priority queue 410, a Medium priority queue 420, and a Low priority queue 430. The queues are First-In-First-Out ("FIFO") queues. As the packet tags are received, the QoS controller puts each tags into one of the queues according to its assigned transmit instructions, i.e. selected server and priority. Thus, if a packet tag has the transmit instructions of "server 1" and "Medium priority", it will be queued in the Medium priority queue 420 associated with Port 1.

The transmit scheduler 360 effectively generates a transmit queue by picking off the packet tags from the various queues according a predefined schedule and sends the prioritized transmit packet tags to the transmitter 324 of the Buffer controller 120 (see FIG. 8). The predefined schedule is based on the following requirements. Packets should be generally be ordered according to their assigned priority, but also in regard to how busy is the destination server. The second considerations allows management of server headroom, so that at any time a server would not be totally swamped by lower priority requests in the absence of High priority requests.

The transmit scheduler schedules removal of the packet tags from each queue with the aid of two flags. The EmptyFlag indicates whether the queue is empty (=1) or nonempty (=0). When a queue is non-empty, it is ready for packet removal, subject to the condition of the ActiveFlag. The ActiveFlag is used to implement server headroom and indicates whether the queue is active (=1) or not active (=0) for packet tag removal. When a queue is inactive, it is in a "sleep" state, and can be used to hold back lower priority packets. In general, there will be a set of these two flags for each queue. The ActiveFlags such as HActiveFlag 414, MActiveFlag 424 and LActiveFlag 434 are updated dynamically at predetermined intervals based on the load of the associated server. Thus, for the High priority queue 410, the corresponding flags are HEmptyFlag 412 and HActiveFlag 414. For the Medium priority queue 420, the corresponding flags are MEmptyFlag 422 and MActiveFlag 424. For the Low priority queue 430, the corresponding flags are LEmptyFlag 432 and LActiveFlag 434.

Figure 13:
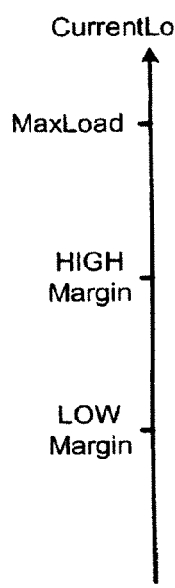
FIG. 13 is a table showing how the ActiveFlags are set as a function of server load.

FIG. 13 is a table showing how the ActiveFlags are set as a function of server load (i.e. how busy the server is). Each server has load metrics to measure what it considers busy (see FIG. 10C). "Max Load" is a load level where the server is about to saturate. "LOW Margin" is a load level where the server is not busy and therefore has much headroom. "HIGH Margin" is a level where the server is quite busy and therefore has a little headroom left. It can be seen that, among the three priority queues, packet tags in the High priority queue will be served first without regard to server workload condition. Thus, HActiveFlag is active for packet removal ("1") for all server load conditions. The packet tags in the Medium priority queue are active for removal only when the server load is below the HIGH margin mark. If the server load is above the HIGH margin mark, the removal of the Medium priority packet tags is slowed by putting the queue to sleep in alternate intervals. In the case of Low priority packet tags in the Low priority queue, they are active for removal only when the server load is below the LOW margin mark. When the server load is in the region between the LOW and HIGH margin marks, the removal of the Low priority packet tags are slowed by putting the queue to sleep in alternate intervals. When the sever load is above the HIGH margin mark. The Low priority queue is put to sleep.

In addition to the sleeping times for Medium and Low priority queues, there are also maximum queue size thresholds for both Medium and Low priority queues. When the Medium (Low) priority queue reaches the maximum queue size, the oldest packet tags in the Medium (Low) priority queue will be discarded. Since High priority packet tags will be served first and there is likely no large queue size built up for these packet tags, there will be no maximum queue size restriction for them.

Figure 14:
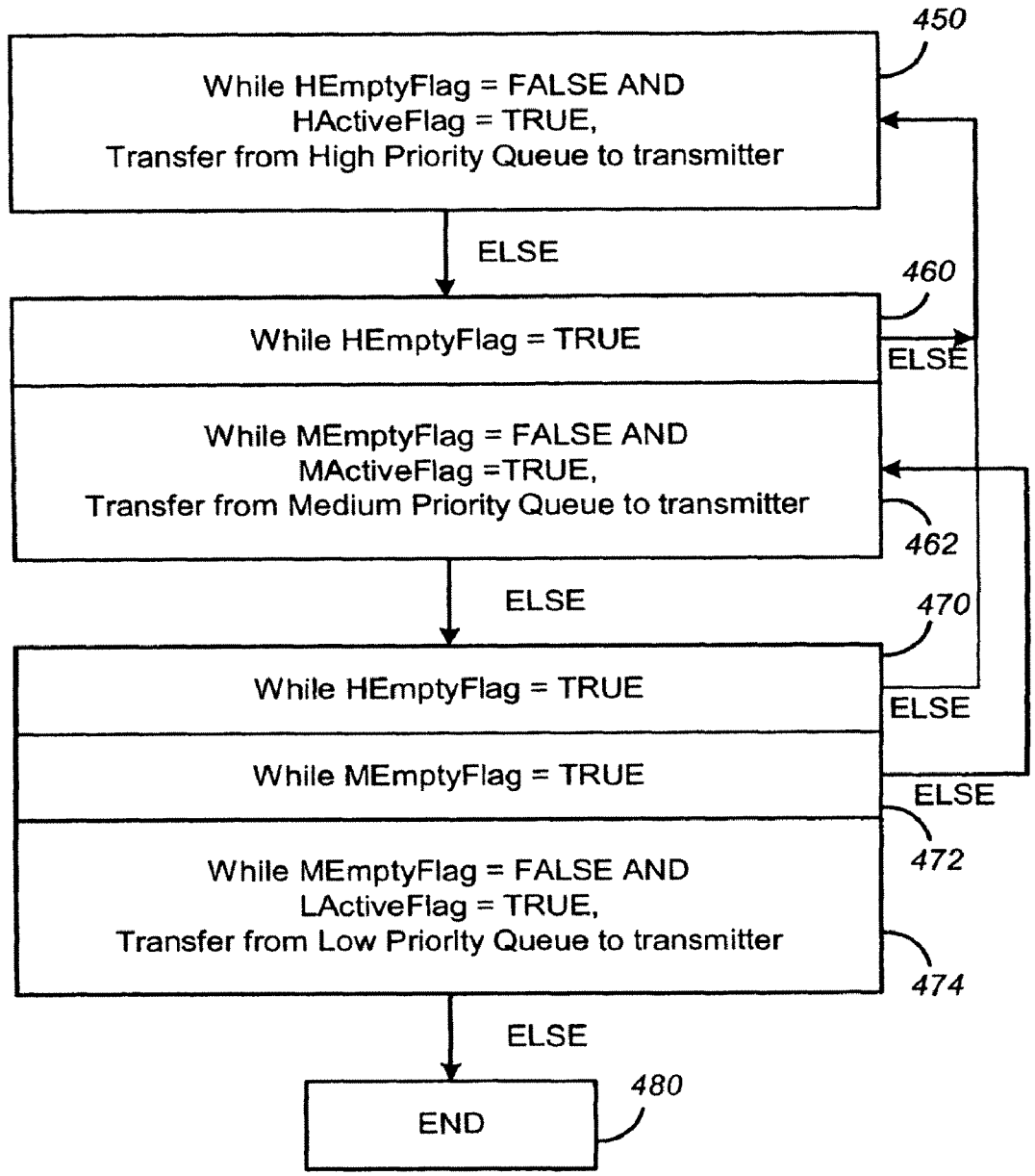
FIG. 14 is a flow diagram illustrating a preferred schedule of packet prioritization for a given server port.

FIG. 14 is a flow diagram illustrating a preferred schedule of packet prioritization for a given server port.

High Priority Queue

Step 450: While there is a packet tag in the High priority queue and the queue is active, transfer the packet tag to the transmitter. Otherwise go to Step 460.

Medium Priority Queue

Step 460: Do Steps 462 while the High priority queue is empty, otherwise go to Step 450.

Step 462: While there is a packet tag in the Medium priority queue and the queue is active, transfer the packet tag to the transmitter. Otherwise go to Step 470.

Low Priority Queue

Step 470: Do Step 472 while the High priority queue is empty, otherwise go to Step 450.

Step 472: Do Step 474 while the Medium priority queue is empty, otherwise go to Step 462.

Step 474: While there is a packet tag in the Low priority queue and the queue is active, transfer the packet tag to the transmitter, otherwise go to Step 480.

Step 480: End.

For N server ports, when more than one port has a non-empty High priority queue, the transmit scheduler transfers the packet tags from the plurality of non-empty High priority queues in an equitable manner, such as using a "Round Robin" schedule. The Medium and Low priority queues are treated similarly.

Referring again to FIG. 8, the transmit scheduler 160 effectively transfers the packet tags to the transmitter 324 as a transmit queue in the order prescribed by the schedule described above. In the meantime, an address modifier 366 in the transmit controller modifies the packets in the packet buffer 322 corresponding to the packet tags. It modifies the Layer 2-4 destination addresses to that of the designation server. In this way, when the transmitter 324 releases the packets in the packet buffer onto the IP bus 100, according the packet tags in the transmit queue, the packets will have the correct addresses to proceed to their respectively selected server.

Traffic from a server back to the client is usually deterministic and the application switch merely performs the function of changing the IP and MAC addresses of a packet from that of the switch to that of the client. This is implemented by TCP splicing or Network Address Translation ("NAT").

The application switch is preferably implemented by a collection of tightly coupled application-specific integrated circuits ("ASICs"). In the preferred embodiment, a network processor, embodied by multiple programmable microengines and a core processor, is used to implement and manage the various components. An example of such a network processor is Intel IXP 1200 Network Processor manufactured by Intel Corporation, Santa Clara, Calif., U.S.A.

Slow-Start New Server Selection

According to another aspect of the invention, a slow-start server selection method is advantageous employed to alleviate the problem of a server newly put online from being swamped due to existing load balancing schemes.

The four established load balancing algorithms identified earlier do not address the problem when a new server is brought up online among a group of servers participating in load balancing. The newly added server, by virtue of an initial low workload, can be flooded with new requests, which will quickly degrade the service quality perceived by the users. This is because these algorithms take into account only server utilization factor, (e.g., selecting a server with the least workload) resulting in the selection tipping heavily towards the newly added server.

As described earlier, the preferred load-balancing scheme is "Weighted Least Connection", which selects a server with the minimum CurrentLoad, where CurrentLoad=number of weighted connections=Summing over {DefaultServerWeight*ClassLoad(i)}, where i=1 to Current-Connections. (See FIGS. 10B, 10C, 10D).

In the slow-start load-balancing method, the server load metric for a newly added server has a configurable server-weight factor. In the calculation for CurrentLoad, the Default-ServerWeight is replaced by a DynamicServerWeight (see FIGS. 10C and 10D). The DynamicServerWeight is initially made larger but eventually converges to the value of the DefaultServerWeight. Generally, the DynamicServerWeight is such that it reduces the disparity in the normalized Current-Loads (i.e., CurrentLoad normalized by ServerWeight) of the new server and a typical server among the group. In this way, the chance of the new server always having the smallest normalized CurrentLoad and therefore always being selected is reduced. As the new server establishes more connections with the application switch, the DynamicServerWeight is gradually reduced until it becomes the same as the Default Server Weight. At this point, the new server's normalized CurrentLoad will have increased to a level similar to the rest of the server group.

Figure 15:
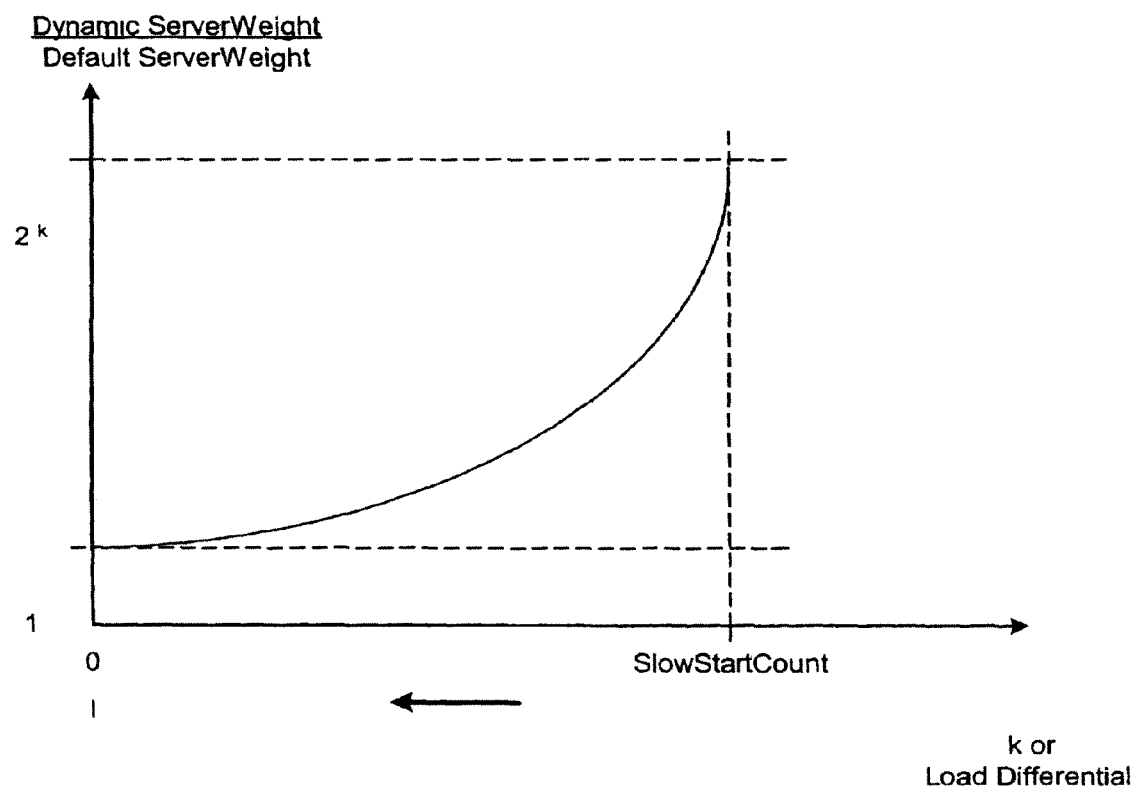
FIG. 15 illustrates schematically a Dynamic Server Weight that converges to the Default Server Weight as the Current Load of the newly put online server approaches the average Current Loads of the servers in a group participating in load balancing.

FIG. 15 illustrates schematically a DynamicServerWeight that converges to the DefaultServerWeight as the normalized CurrentLoad of the newly put online server approaches the average normalized CurrentLoad of the other servers in a group participating in load balancing. In a preferred embodiment, DynamicServerWeight=$2^k$DefaultServerWeight, where k is an integer initially set to equal SlowStartCount, which is a configurable number. In this way, DynamicServerWeight converges to DefaultServerWeight as k is counted down to zero during a period that the normalized CurrentLoad of the new server increases to approach a level similar to that of the rest of the servers in the group participating in load balancing. For example, initially k=5, and each time the disparity is reduced by a factor of two, k is reduced by one.

Figure 16A:
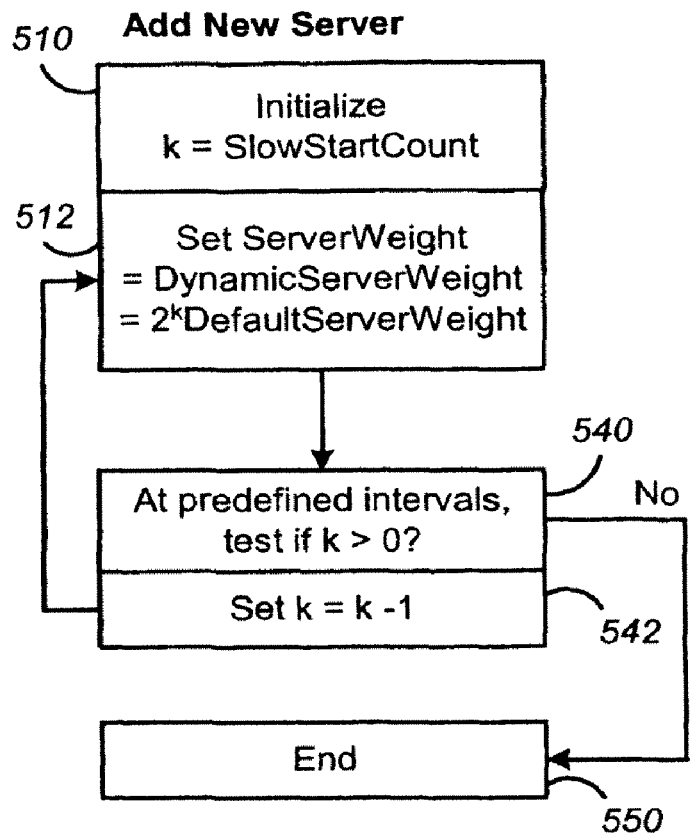
FIG. 16A is a flow chart illustrating the process of adjusting the server weight of the new server being added to the group of servers under load balancing.
Figure 16B:
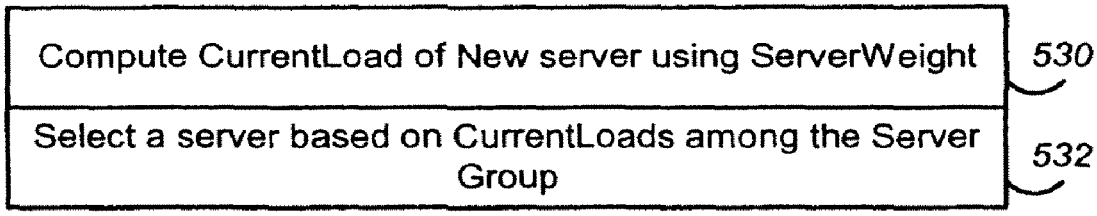
FIG. 16B is a flow chart illustrating the process of performing load balancing with the new server included in the group of servers under load balancing.

FIGS. 16A and 16B are flow charts illustrating load-balancing with a newly incorporated server, according to one preferred embodiment of the invention.

In a preferred implementation, there are three processes. The first is the initialization process of setting an initial value for the ServerWeight of the new server. The second is switching a packet subject to load balancing with the group of servers, including the new server. The third is to adjust the ServerWeight of the new server to converge to DefaultServerWeight over a predefined period during load balancing.

FIG. 16A is a flow chart illustrating the process of adjusting the server weight of the new server being added to the group of servers under load balancing.

Step 510: Initialize k=SlowStartCount.

Step 512: Set ServerWeight=DynamicServerWeight= $2^k$DefaultServerWeight, go to Step 540.

Step 540: At predefined intervals while load balancing is ongoing (see Steps 530 and 532), test if k=>0?, if so, go to Step 542, else go to Step 550.

Step 542: Set k−1, decrementing the server-weight factor by half, then go to Step 512.

Step 550: End.

This is the point where k is zero, and the new server has a ServerWeight DefaultServerWeight. Its CurrentLoad normalized by its DefaultServerWeight is similar to that of the other servers in the group.

FIG. 16B is a flow chart illustrating the process of performing load balancing with the new server included in the group of servers under load balancing. Load balancing can begin as soon as the ServerWeights for all the servers, including the newly added one, is set, as in Steps 512 and 520.

Step 530: Compute CurrentLoad of the server using ServerWeight.

Step 532: Select a server based on CurrentLoads among the Server Group.

Content-Aware Switching without Delayed Binding

According to another aspect of the invention, a method is provided to perform content-aware switching without incurring delay and excessive processing while initially waiting for content to become available in order to make switching decisions.

The servers in a data center/call center can be the performance bottleneck for web applications in many cases. All existing load-balancing algorithms mostly use Layers 3 and/or 4 information to select a server.

As described earlier, different web applications may have different required server load implications. This information is derivable by identifying from the application layer (Layer 7) the class of application and associating it with a Class-Weight (see FIG. 10B). Load balancing is more refined when Class Weight is taken into consideration.

However, application layer information typically arrives after the initial TCP handshaking process. The first few packets used for handshaking purposes carry no application layer information. Thus, if load balancing is also dependent on Layer 7 information, the switch will have to wait until after the handshaking is completed to obtain it in order to select a server (delayed binding). The former treats all applications on the same server group equally and does not take into account the difference in load demand by different applications. The latter uses TCP splicing and is process intensive.

FIG. 17 illustrates the handshaking at the beginning of a TCP session between a client, an intermediate switch and a server under the TCP splicing scheme. First the client initiates a TCP session with the switch. The first three packets exchanged are for handshaking between client and switch. The application layer packets come after the handshaking packets. The switch then uses the application layer information to make switching decisions. Thereafter, the switch initiates another TCP session with the selected server. This tandem process of TCP splicing is inefficient and process intensive but is necessary if application layer information must first be obtained by the switch in order to select a server to switch to.

The present invention prescribes using application layer (Layer 7) information to perform load balancing as soon as the first handshaking packet from a new TCP session arrives. This is accomplished by using the application layer information from a previous TCP session as a best estimate for the new session. This scheme works if there is only one server group in the server farm, as is typical, and therefore Layer 7 information is not necessary to select a server group. Thus, load balancing is performed on the basis of workloads of servers based on data from a previous TCP session. Since a server can be selected on the fly, the handshaking packets can be sent directly to the server without performing the tandem process of TCP splicing.

FIG. 18 illustrates the streamlined TCP process of the present invention. When the switch receives a handshaking packet, a server is selected based on the servers' load metrics, which are dependent on Layer 7 information of a previous session. The packet is redirected on the fly to the server. Similar, the returned packet from the server is redirected at the switch on the fly to the client. As soon as a packet carrying Layer 7 information arrives, the switch uses it to update the server load metric so that it can provide the most current estimate for the next TCP session.

As for QoS control, the few handshaking packets at the beginning of a new TCP session are assigned a default High priority so that the handshaking process can be completed without delay and the Layer 7 information be available as soon as possible. When the Layer 7 information becomes available, it will be used to prioritize the current packets in the manner described earlier.

Figure 19:
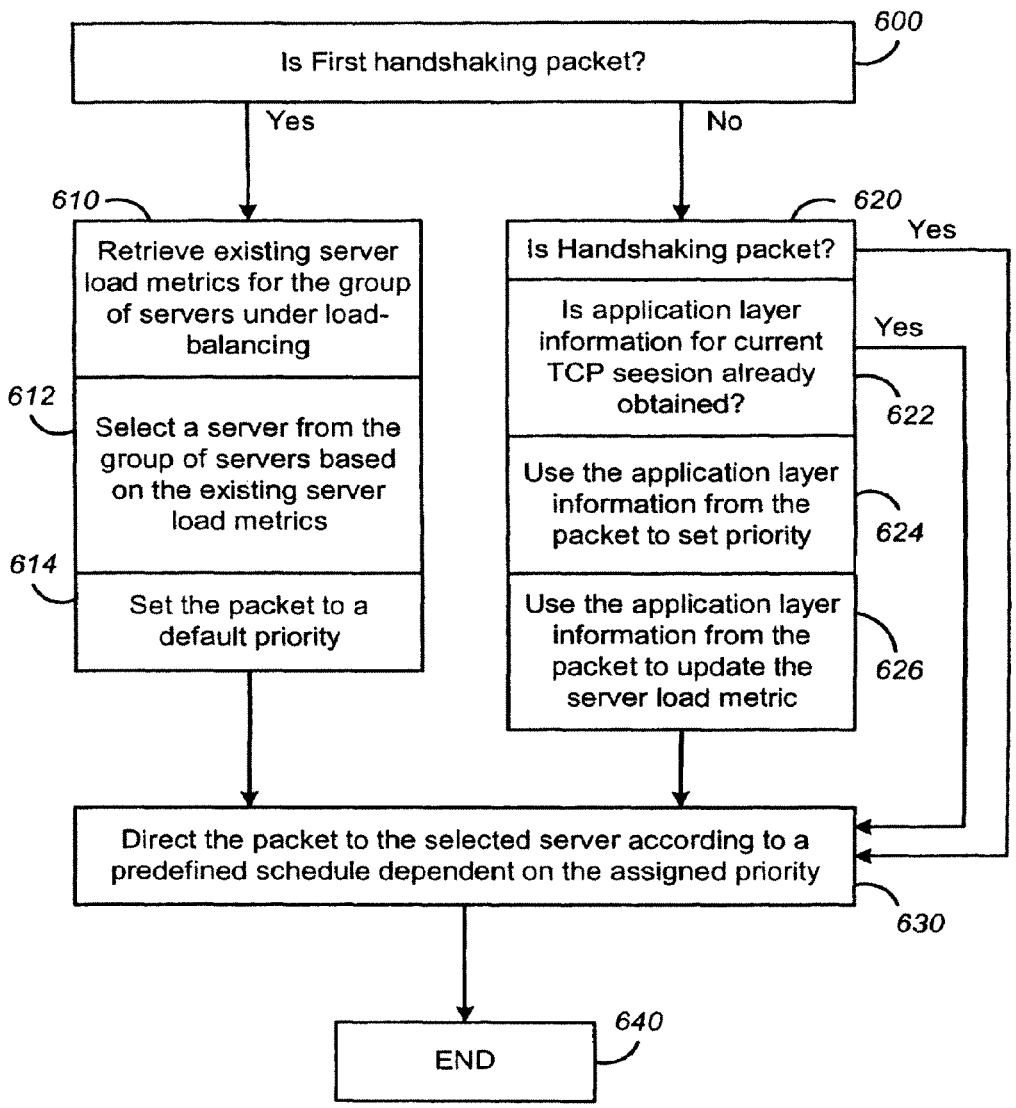
FIG. 19 is a flow chart illustrating the method of content-aware switching without delay binding.

FIG. 19 is a flow chart illustrating the method of content-aware switching without delay binding.

Step 600: If the packet is a first handshaking packet, go to Step 610, else go to Step 620.

Step 610: Retrieve existing server load metrics for the group of servers under loads balancing. These existing server load metrics have been updated based on application layer information of a previous TCP session.

Step 612: Select a server from the group of servers based on the existing server load metrics.

Step 614: Set the packet to a default priority. Go to Step 630.

Step 620: If the packet a handshaking packet, go to Step 622, else go to Step 630.

Step 622: If application layer information for current TCP session has already been obtained, go to Step 624, else go to Step 630.

Step 624: Use the application layer information from the packet to set priority for the packet.

Step 626: Use the application layer information from the packet to update the server load metrics. The server load metric will be used in the next TCP session to select a server. Go to Step 630.

Step 630: Direct the packet to the selected server according to a predefined schedule dependent on the assigned priority.

Step 640: End

Thus it is possible, by the present invention, to implement application-aware load balancing and QoS control without having to use delayed binding. The server load metrics used in the load-balancing algorithm are updated based on application layer information after a server is selected. This way, the server selection process does not need to "wait" (hence requiring delayed binding) for application layer information to arrive in order to select a server for the "current" request. However, after the application layer information is available, the server load metric is updated based on the application and hence reflected on the next server selection process.

While the embodiments of this invention that have been described are the preferred implementations, those skilled in the art will understand that variations thereof may also be possible. Therefore, the invention is entitled to protection within the full scope of the appended claims.

What is claimed is:

1. A method comprising:
   maintaining a server load metric for each server in a group of servers;
   parsing application content from a packet;
   selecting a destination server from the group of servers, wherein selecting the destination server is dependent on the server load metric for each server;
   assigning a priority to the packet, the priority being dependent on the application content; and
   dropping the packet if the priority comprises at least one of a predetermined type.

2. The method of claim 1, further comprising transmitting the packet to the destination server according to a transmitting schedule, the transmitting schedule being dependent on the priority.

3. The method of claim 1, further comprising referencing an access control list to enforce security, the access control list being dependent at least in part upon the application content.

4. The method of claim 3, wherein referencing an access control list further comprises dropping the packet if the application content comprises a first predetermined type.

5. The method of claim 4, wherein referencing an access control list further comprises redirecting the packet to a predetermined location if the application content comprises a second predetermined type.

6. The method of claim 1, wherein the priority comprises at least one of a first priority and a second priority, the second priority being lower than the first priority, wherein the destination server has a workload above a first predetermined level, and the transmitting schedule is constructed such that, if the packet comprises the first priority then the packet is transmitted to the destination server without delay and if the packet comprises the second priority then the packet is held back from being transmitted to the destination server.

7. The method of claim 1, further comprising:
determining at least one eligible server from among the group of servers, wherein determining at least one eligible server is dependent on the application content; and
selecting the destination server from among the at least one eligible servers.

8. The method of claim 1, further comprising:
determining an estimated application load for the destination server, the estimated application load being dependent at least in part upon the application content;
wherein selecting a destination server is also dependent at least in part upon the estimated application load.

9. The method of claim 1, wherein the transmitting schedule is also dependent at least in part upon the server load metric for each server.

10. The method of claim 1, wherein the application content comprises a Hypertext Transfer Protocol header.

11. A non-transitory computer readable medium, the computer readable medium including instructions, which when executed performs steps comprising:
maintaining a server load metric for each server in a group of servers;
parsing application content from a packet;
selecting a destination server from the group of servers, wherein selecting the destination server is dependent on the server load metric for each server assigning a priority to the packet, the priority being dependent on the application content; and
dropping the packet if the priority comprises at least one of a predetermined type.

12. The non-transitory computer readable medium of claim 11, wherein the steps further comprise transmitting the packet to the destination server according to a transmitting schedule, the transmitting schedule being dependent on the priority.

13. The non-transitory computer readable medium of claim 11, wherein the steps further comprise referencing an access control list to enforce security, the access control list being dependent at least in part upon the application content.

14. The non-transitory computer readable medium of claim 13, wherein referencing an access control list further comprises dropping the packet if the application content comprises a first predetermined type.

15. The non-transitory computer readable medium of claim 14, wherein referencing an access control list further comprises redirecting the packet to a predetermined location if the application content comprises a second predetermined type.

16. The non-transitory computer readable medium of claim 11, wherein the priority comprises at least one of a first priority and a second priority, the second priority being lower than the first priority, wherein the destination server has a workload above a first predetermined level, and the transmitting schedule is constructed such that, if the packet comprises the first priority then the packet is transmitted to the destination server without delay and if the packet comprises the second priority then the packet is held back from being transmitted to the destination server.

17. A method comprising:
maintaining a server load metric for each server in a group of servers;
parsing application content from a packet;
determining at least one eligible server from among the group of servers, wherein determining at least one eligible server is dependent at least in part upon the application content;
selecting a destination server from among the at least one eligible server;
determining an estimated application load for the destination server, the estimated application load being dependent at least in part upon the application content;
assigning a priority to the packet, the priority being dependent at least in part upon the application content; and
dropping the packet if the priority comprises at least one of a predetermined level.

18. The method of claim 17, further comprising transmitting the packet to the destination server according to a transmitting schedule, the transmitting schedule being dependent at least in part upon the priority and the server load metric for each server; wherein the step for selecting the destination server is dependent at least in part upon the server load metric for each server in the group of servers and the estimated application load.

19. The method of claim 17, wherein the application content comprises a Hypertext Transfer Protocol header.

20. The method of claim 17, wherein the priority further comprises at least one of a first priority and a second priority, the second priority being lower than the first priority, wherein the destination server has a workload above a first predetermined level of the at least one of a predetermined level, and the transmitting schedule is constructed such that, if the packet comprises the first priority then the packet is transmitted to the destination server without delay and if the packet comprises the second priority then the packet is held back from being transmitted to the destination server.

* * * * *